J. F. RUDE.
STRAW SPREADER.
APPLICATION FILED APR. 15, 1918.

1,321,152. Patented Nov. 11, 1919.

INVENTOR
John F. Rude
BY
Bradford & Doolittle
ATTORNEYS

UNITED STATES PATENT OFFICE.

JOHN F. RUDE, OF LIBERTY, INDIANA.

STRAW-SPREADER.

1,321,152. Specification of Letters Patent. Patented Nov. 11, 1919.

Application filed April 15, 1918. Serial No. 228,727.

*To all whom it may concern:*

Be it known that I, JOHN F. RUDE, a citizen of the United States, residing at Liberty, Union county, and State of Indiana, have invented and discovered certain new and useful Improvements in Straw-Spreaders, of which the following is a specification.

My invention relates to straw spreaders. The objects of the invention are to provide a construction which will enable the capacity of the spreader to be increased beyond that heretofore possible with implements of this class and to an extent that will render the use of straw spreaders economically practicable and advantageous by reason of the increased load carried and decreased field traverses per given quantity made possible, and to obtain such results in connection with a machine which may be employed also as a manure spreader.

With these objects in view, my invention is embodied in preferable form in the implement hereinafter described and illustrated in the accompanying drawings.

Figure 1:
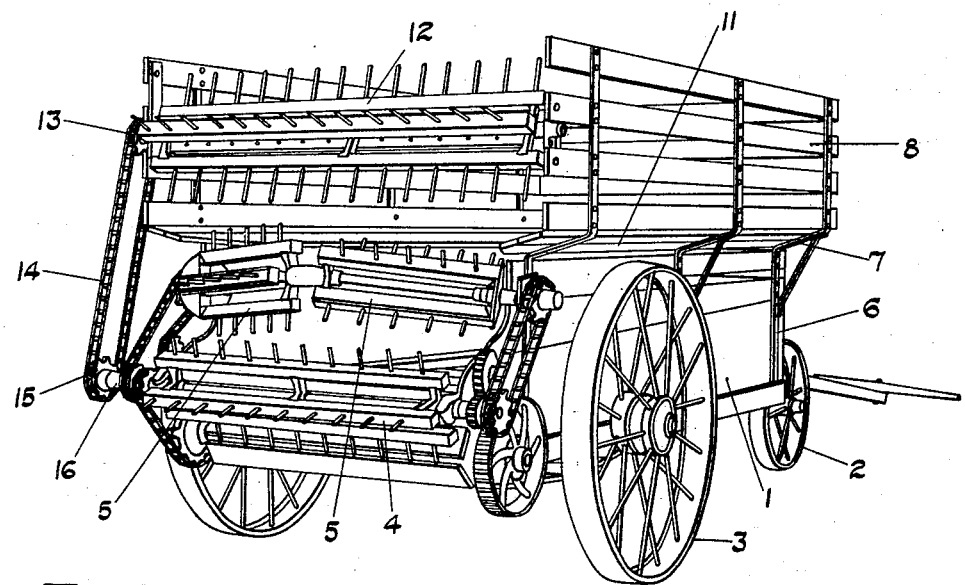
Figure 2:
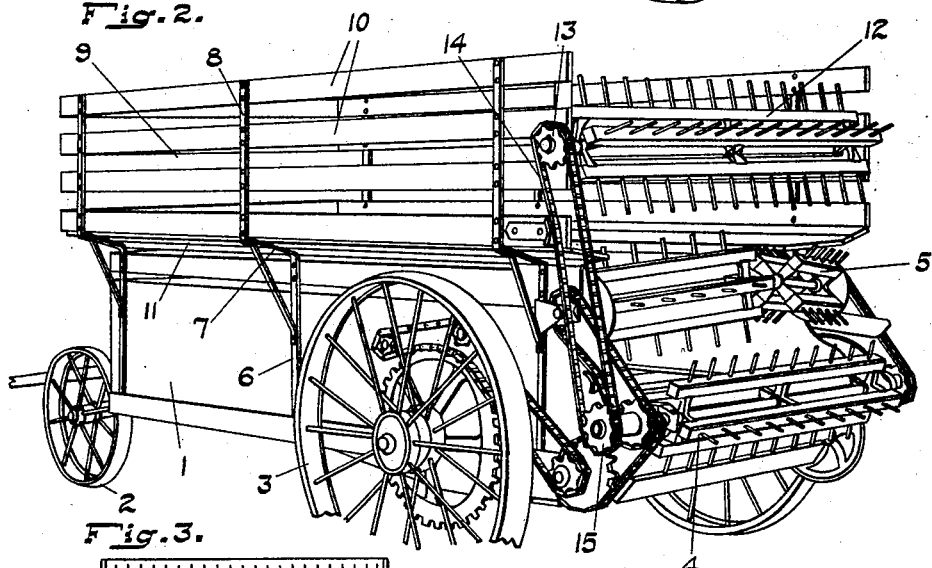
Figure 3:
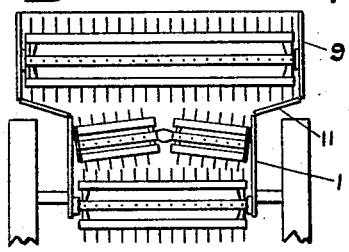

In these drawings, Figure 1 is a perspective view of a straw spreader embodying my invention and looking at the same from one rear corner; Fig. 2, a similar view looking at the other side of the machine, and Fig. 3, a detail rear view in elevation on a smaller scale than that of Figs. 1 and 2.

Referring to the drawings, 1 indicates the side walls of the main load carrying body of the carrier, 2 the front wheels of said carrier and 3 the larger rear wheels. Mounted in the lower part of the main carrier body and extending across the latter, is a rotatable toothed distributing beater 4, adapted to be driven by suitable gear and chain connections to the axle of the rear wheels. Above said beater are mounted in the main carrier body, two beater elements 5, inclined rearwardly from the transverse axis of the carrier to obtain a wide spread of the straw or other material carried by the implement, and also inclined upwardly from the outer ends of the beater elements toward the center to enable an even distribution of an arch-shaped load. An endless conveyer is mounted at the bottom of the carrier. The parts of the implement thus described are those which may constitute a manure spreader and to these features are added the elements adapted to make the device adaptable as a straw spreader.

Attached to the main body by means of bars comprising vertical sections 6, laterally projecting inclined arms 7, and strap sections 8, is a supplemental load carrying body or rack 9, which may consist of separated boards 10, lying in vertical planes and bolted to the supporting strap sections of the upright bars, and of bottom sections 11, downwardly inclined toward the center of the body. These bottom sections extend out beyond the plane of the main body and above the main rear wheels.

Mounted in this rack and extending entirely across the width of the same is a distributing beater 12. The shaft of this beater extends through the rack body and at one end thereof said shaft is provided with a sprocket wheel 13 adapted to be driven by a chain 14 which is connected at its lower end to a driving sprocket 15 carried at the end of a prolonged extension 16 of the shaft of the lowest beater. It will be seen that the shaft of this lowermost beater lies to the rear of the circumference of the rear driving wheels, and hence it is rendered possible to extend the driving sprocket chain from the extended end of the shaft to the driving sprocket of the uppermost beater in a plane substantially coincident with the plane of the large wheels without interference with the latter. The uppermost auxiliary beater 12 is wider than the lower beaters and is thereby enabled to engage and distribute a much larger quantity of the load than would be possible if said beater were of the same width as the lower beaters. The greater width of this beater in conjunction with the greater width of the auxiliary load carrying body of the rack obtains a capacity of spreader which is substantially fifty per cent. greater than the devices of this class heretofore used in which the sides of the spreader lie in continuous vertical planes, with all the beaters of equal length. Such difference is a matter of great importance to the farmer in the use of the implement since the increased capacity enables the straw to be spread over the field by a much smaller number of trips per quantity of straw to be distributed, thus resulting in such a substantial gain in time and labor as to greatly extend the usefulness and practicability of straw spreaders.

Having thus described my invention, what I claim is:

A spreader having a main body, a supplemental body above the main body of greater width than said main body and formed with vertical side walls, a distributing beater mounted in said supplemental body and extending entirely across the same within the side walls thereof, and a bottom section joining the said vertical walls of the upper body with the upper edges of the main body below said distributing beater, substantially as set forth.

In witness whereof, I have hereunto set my hand and seal at Liberty this 11th day of April, A. D. nineteen hundred and eighteen.

JOHN F. RUDE. [L. S.]

Witnesses:
ADELAIDE MAIBAUGH,
MILDRED MAIBAUGH.

Copies of this patent may be obtained for five cents each, by addressing the "Commissioner of Patents, Washington, D. C."